June 24, 1924.

A. R. THOMPSON

METHOD OF PROCESSING MILK

Filed June 6, 1923

A. R. THOMPSON

METHOD OF PROCESSING MILK

Filed June 6, 1923

Inventor:
Albert R. Thompson
By Alexander & Powell
Attorneys

Patented June 24, 1924.

1,499,038

UNITED STATES PATENT OFFICE.

ALBERT R. THOMPSON, OF SAN JOSE, CALIFORNIA, ASSIGNOR TO ANDERSON-BARN-GROVER MFG. CO., OF SAN JOSE, CALIFORNIA, A CORPORATION OF CALIFORNIA.

METHOD OF PROCESSING MILK.

Application filed June 6, 1923. Serial No. 643,711.

*To all whom it may concern:*

Be it known that I, ALBERT R. THOMPSON, a citizen of the United States, residing at San Jose, in the county of Santa Clara and State of California, have invented certain new and useful Improvements in Methods of Processing Milk; and I hereby declare that the following is a full, clear, and exact description thereof, reference being had to the accompanying drawings, which form part of this specification.

My invention relates to the art of processing condensed or evaporated milk in hermetically sealed containers (usually tin cans). In order to prevent the deposition on the interior surface of the containers of a coating of albumin, it is necessary to subject the containers filled with the milk to a gradually increasing temperature beginning at about say 70° F. and increasing gradually to 240° F., the latter being the cooking temperature at which the goods are kept for the required time.

In common practice the filled and sealed containers are stacked in a processing vessel or retort, which is supplied with water at about a temperature of 70° F.; and the temperature of the water is then gradually raised to the cooking temperature in about 20 minutes' time. This is called the "batch" method, a number of containers being handled as a unit and subjected successively to the various heat treatments, generally in the same vessel, and without any relative movements of the cans in such group during such treatments.

One object of my present invention is to provide a novel process of heat treating canned milk wherein the filled containers are successively passed in a continuous series and at a proper speed through successive regions of varied temperature and continuously discharged. This novel process may be carried on continuously, yet each container is gradually raised to the cooking temperature and maintained thereat for the desired time, the deposition of albumin in the container being prevented. A further object of the invention is to provide for detecting defective or imperfectly sealed containers during the performance of the process between the pre-heating chamber and the sterilizing chambers. A further object is to provide means whereby after the cooking the containers may be cooled sufficiently to obviate the danger of rupture of the cans by internal pressure, when the containers are discharged to the atmosphere.

Hereafter in the description I will for brevity refer to the containers filled with canned milk merely as "cans", but by "cans" I mean to include any suitable containers filled with the evaporated or condensed milk to be sterilized.

My invention consists in brief in a novel method of processing milk comprising the passing of the cans in a continuous stream through the initial preheating regions of successively increasing temperature reaching a maximum below the temperature required for sterilizing; then passing said containers without interruption through a region wherein the temperature is maintained at that required for sterilizing; the cans being preferably passed through a region exposed to the atmosphere between the preheater and the sterilizer, so that any defective cans can be detected and removed; and finally passing the cans uninterruptedly from the sterilizer without exposure to the atmosphere into and through a region in which a cooling temperature is maintained the cans being retained in such regions until their contents are sufficiently cooled to eliminate any danger of rupture of the cans by internal pressure when they are discharged into the atmosphere.

In the accompanying drawings I have conventionally illustrated a form of apparatus in which my method may be successfully carried out, though it is to be understood that this is merely illustrative and that the apparatus may be varied, and that other types or forms may be used without affecting my method.

In carrying out my process I employ three separate chambers which are preferably the interiors of similar separated receptacles A, B, and C, which are respectively used for preheating the cans, for sterilizing the cans, and for cooling the cans in my method of processing milk.

Figure 1:
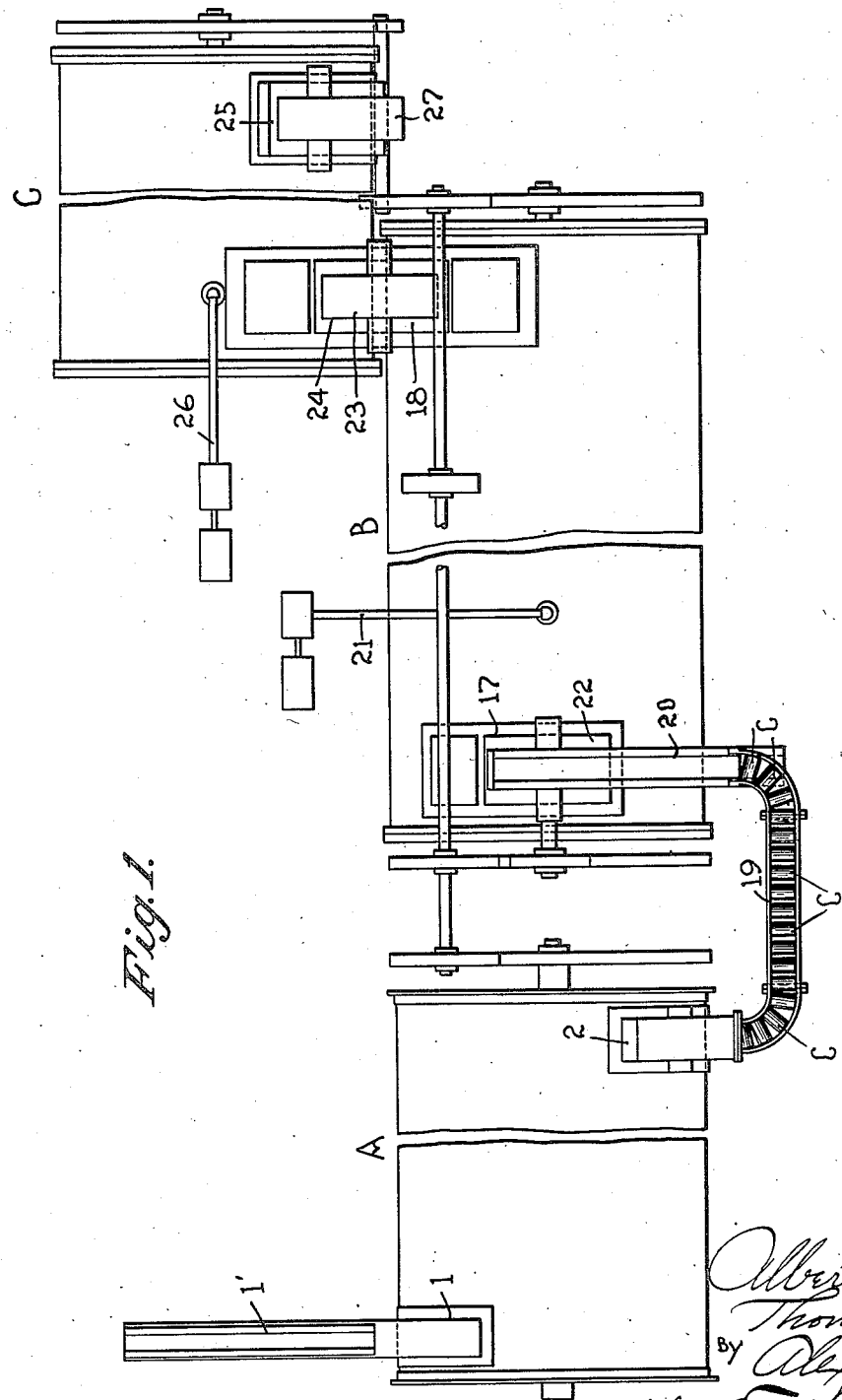
Fig. 1 is a diagrammatical top plan view, partly broken, of an apparatus for carrying out my process.

The preheater A may be of any suitable kind, and is shown as composed of a shell provided with a can inlet 1 near one end and a can outlet 2 near its other end. Within the shell (Fig. 2) and adjacent its inner circumference, is a fixed helically directed rail 3 which forms a spiral canway and guide. Within this spiral is a rotatable reel 4 composed of end disks or spiders $4^b$, $4^c$, mounted on a shaft $4^a$, and carrying a series of spaced rails 5 parallel with the reel axis and lying in such proximity to the fixed helical rail or canway, as to retain and move the cans therein, said rails 3 and 5 coacting to cause the cans to move in a helical path along which the cans are continuously advanced from the inlet 1 to the outlet 2, Fig. 1, in a manner common to and well known in the art. The cans may be continuously supplied to the inlet of the preheater by any suitable means, the usual feed elevator being indicated at 1' in Fig. 1.

In the apparatus shown the preheater A is divided into a plurality of successive regions or chambers which are of successively higher temperature. In the form shown rotatable imperforate disks $4^d$, $4^e$ are attached to the reel shaft $4^a$ between the reel heads or spiders $4^b$, $4^c$, thus dividing the length of the receptacle into three regions or chambers, the first A' being between the disks $4^b$, $4^d$; the second $A^2$ between the disks $4^d$, $4^e$; and the third $A^3$ between the disks $4^e$, $4^c$. These chambers of course peripherally communicate through the continuous canway formed by the rails 3 and 5; but when the apparatus is in operation and this canway is filled with cans, the communication between the chambers is but slight, and renders it possible, in practice, to maintain in each chamber, a degree of temperature different from that in the others, without appreciable interchange of heat.

Figure 2:
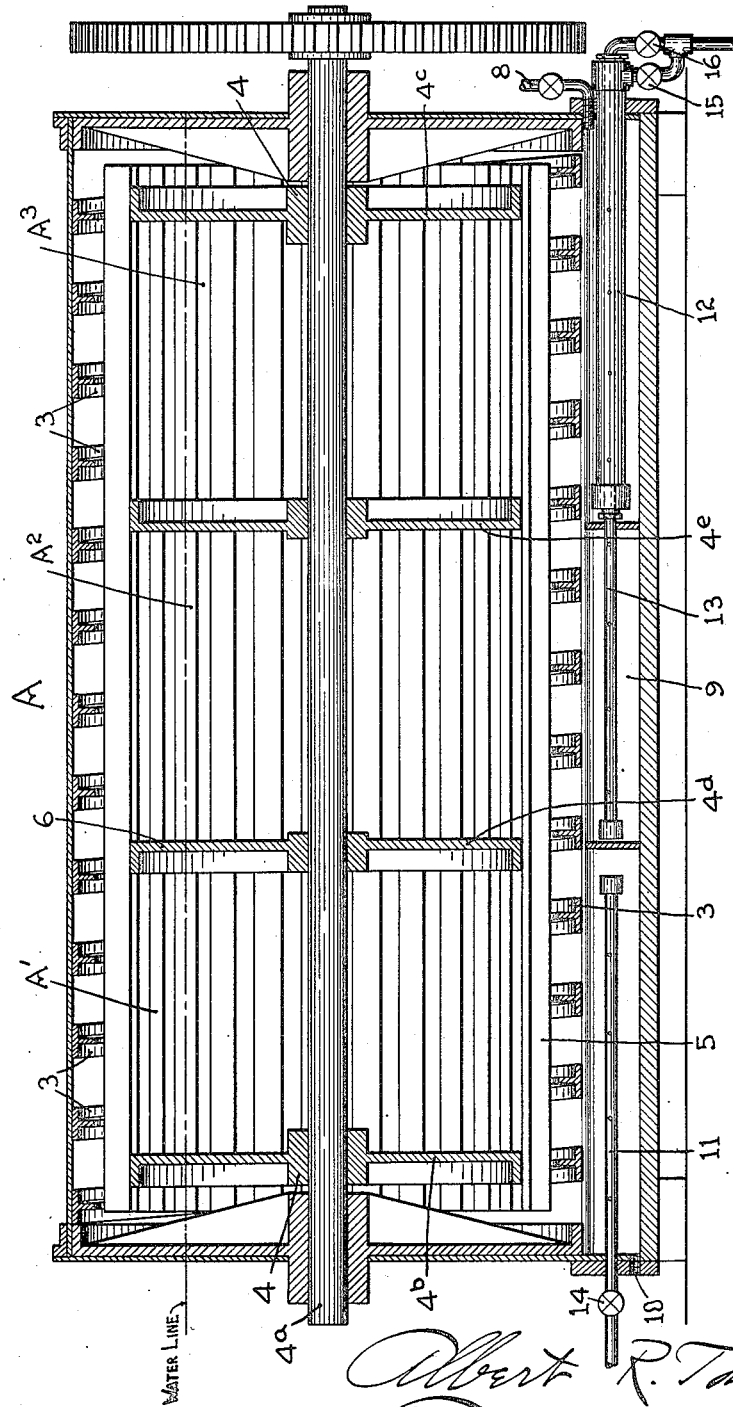
Fig. 2 is an enlarged longitudinal vertical sectional view, of one of the preheaters.

The heating medium is preferably water with which the preheater may be filled to the level indicated in Fig. 2. This water may be supplied by a pipe 8, and can be drained off when necessary through a drain opening in the bottom of the receptacle which opening is normally closed by a plug 10 or other suitable means.

The water in the preheating chamber may be heated in any suitable way, preferably by means of steam admitted through perforated pipes. For example, as shown, a steam pipe 11 enters the preheater and lies below the first chamber A'.

Another steam pipe 12 enters the preheater and lies below the third chamber $A^3$; and still another steam pipe 13, conveniently passing through the steam pipe 12, lies below the chamber $A^2$. Each of these pipes may be independently and preferably automatically controlled, as to the volume of steam admitted, in accordance with the temperature desired in each of the chambers. I have indicated said pipes as having controlling cocks 14, 15 and 16, respectively, and these may be operated automatically if desired by any suitable connections and devices (not shown) under temperature control, as for example, thermostats located in the respective chambers. These automatic controlling devices are not shown as they are common appliances, and their operation and effect well known. By such means a different temperature may be automatically maintained in each chamber in the preheater A.

The sterilizer B may be constructed substantially like the preheater, but need have but one chamber within it. As shown it comprises a casing or shell having near one end a can inlet 17, Fig. 1, and at its other end a can outlet 18. The cans may be advanced through the sterilizer by any suitable can advancing means, which it is unnecessary to show, it being sufficient to say that a good form of such means is the usual fixed helically directed rail and a rotating reel, such as used in the preheater and indicated in Fig. 2.

In the sterilizer B is preferably a body of water, not shown, which may be heated by steam pipes housed in an underlying chamber similar to that shown in connection with the preheater A; and the steam is preferably automatically controlled to regulate the heat, as heretofore described in connection with said preheater A.

The inlet to sterilizer B is controlled by a fluid tight valve indicated at 22, and the outlet is likewise controlled by a fluid tight valve at 23, so that the desired pressure may be produced therein.

In order to secure an exterior pressure on the cans in the sterilizer B above atmospheric, compressed air may be admitted through a connection 21, or said pressure may be the direct effect of the confined steam.

A conduit 19 receives the cans C from the outlet 2 of the preheater A and directs them to a feed elevator 20 which carries them to the inlet 17 of the sterilizer B. The cans may be directed through the conduit 19 by gravity or any suitable mechanical means.

The cooler C is preferably similar in construction to the sterilizer B, and has a can inlet 24 and a can outlet 25. Within the cooler C are suitable can advancing means, preferably of the type already described, and preferably a body of cool water, with means to control its supply. Compressed air can be supplied to the cooler C if desired by an air pipe 26 in order to maintain a pressure above atmospheric in the cooler. The cans can be discharged from the cooler by a valve 27 or other suitable means.

In the apparatus shown the valve 23 serves directly to transfer the cans from the outlet of the sterilizer B to the inlet of the cooler C without exposure thereof to the atmosphere between the sterilizer and cooler.

In carrying out my method with the apparatus shown, the cans filled with the previously condensed or evaporated milk, and hermetically sealed, are supplied to the feed elevator 1' and, in a continuous series or stream, are passed into the preheater A, entering the first chamber A' therein. In this chamber a predetermined temperature of say about 70° F. is maintained. The cans pass through chamber A' in a continuous stream and enter the second chamber $A^2$, in which a temperature of about 120° F. is maintained. Through chamber $A^2$ the cans pass continuously and enter the third chamber $A^3$ of the preheater A, in which a temperature of about 210° F. is maintained and through which the cans are continuously advanced. In this way the cans are gradually raised to the desired preheating temperature, and this gradual rise in temperature prevents coagulation of the milk and deposit of albumin in the cans. From the outlet 2 of the preheater A the can stream proceeds continuously and uninterruptedly through the conduit 19 to and through the fluid tight valve 22 and inlet 17 into the sterilizer B.

The conduit 19 is preferably open so that the cans in passing therethrough are exposed to the atmosphere. The temperature of the cans discharged from the preheater is approximately 212° F. and as the cans pass through the conduit 19 if any of the cans had burst or developed a leak in the preheater, or in the conduit, they could be readily detected and removed by the attendant before they pass to the sterilizer. As the pressure in the cans in the preheater caused by a temperature of 200° F. or over, exceeds the pressure exterior to the cans, the cans are liable to rupture or explode if they are defective, and rupturing or defective cans will most likely occur as or just before they are discharged from the preheater into the conduit 19 and are passed therethrough exposed to the atmosphere.

In this sterilizer a cooking temperature of above 240° F. is maintained under a pressure in excess of atmospheric, so that rupture or bursting of the cans by internal pressure generated therein at such temperature is prevented by an exterior pressure on the cans equalizing or exceeding the internal pressure therein.

Through and from the sterilizer the cans pass continuously the cans leaving the sterilizer being directed by the valve 23 (without interruption or exposure to the atmosphere) into the cooler C, in which cooler is also maintained a pressure sufficient to prevent bursting or injury to the cans by the internal pressure generated therein in the sterilizer; and the exterior pressure in the cooler is maintained until the cans are sufficiently cooled to permit them to be discharged into the atmosphere with safety. From the cooler the cans are continually discharged at 27.

In my process of treating milk the filled cans are taken from the filling and capping machine, the milk filled into the cans being about 40° F., and the cans are then successively and continuously passed through the preheater and gradually increased in temperature, not under pressure; and all the time the containers are passing through the preheater they are rolled or so agitated as to constantly change the body of milk over all the inner surfaces of the container and not allow any one portion of the milk to contact with the inner surface of the container for any length of time, nor allow any of the inner surfaces of the container to be uncovered by the milk for any length of time. After the cans have been preheated they are passed from the preheater into the continuous pressure sterilizer in which their temperature can be maintained above 212° F., and an exterior pressure is maintained in the sterilizer above atmospheric pressure to prevent rupture of the cans by internal pressure. The agitation of the contents of the cans is continued, as above described, as they pass through the sterilizer; the cans are then passed from the sterilizer into the cooler in which a pressure above atmospheric is maintained to prevent rupture of the cans by internal pressure; the cans moving continuously through the cooler, and being agitated as described; and finally cooled cans with their sterilized contents are discharged from the cooler.

The cans in most cases are what is known as "soldered" cans, the milk being put into the cans through a very small orifice therein, at a temperature of about 40°, after which the can is sealed or "dotted" by having the small inlet orifice closed with a drop of solder. This "dotting" is not always perfectly done, there sometimes being only a mere skim of solder closing the opening, and this is liable to give way under normal or relatively light internal pressure in the cans, and the milk leaks out. Also the ends of the can are usually only soldered to the body portion and the joint is liable to be faulty and allow the milk to leak therefrom.

If such defective cans are allowed to pass into the sterilizer they are raised from approximately 212° F. to above 240° F. they become further damaged in the sterilizer and are apt to bind or catch in the canway and jam and prevent the proper movement of the series of cans therein, causing damage and great loss of product and time.

As the cans pass through the preheater they are raised to substantially the boiling point and the contents of the can tend to expand and this causes considerable internal pressure in the can, which pressure in practically all cases of defective cans or "dotting" will result in exposing defects in the can or in the "dotting," the pressure causing defective seams or joints of the cans to open, either wholly or partially permitting the contents to leak; or the pressure will rupture a faulty dot over the filling orifice and cause the contents to exude through such orifice. Any such defective or leaking can may be readily detected as it passes through the open runway 19 between the preheater and the sterilizer, milk exuding from any defective can leaving the preheater being readily discernible, and the cans easily removable.

What I claim is:

1. The method of processing milk in hermetically sealed cans; consisting in passing the cans successively in a continuous stream through a preheater in which their temperature is raised to a point below that required for sterilization; then passing said cans without interruption from said preheater into and through a sterilizer in which said containers are subjected to a temperature sufficient to sterilize the contents of the cans and to an exterior pressure above atmospheric; then passing said cans without interruption or exposure to atmospheric pressure continuously from said sterilizer into and through a cooler wherein the cans are subjected to a cooling medium under an external pressure sufficient to prevent internal pressure rupturing the cans, and finally discharging the cans from the cooler, substantially as described.

2. In the method of processing milk as set forth in claim 1, exposing the cans to the atmosphere in their passage between the preheater and the sterilizer for the purpose of detecting imperfect cans.

3. In the method of processing milk set forth in claim 1, the preheater having a plurality of chambers of successively higher temperature, reaching a maximum in the last chamber below the temperature required for sterilization, substantially as described.

4. In the method of processing milk as set forth in claim 1, moving the cans in such manner that their contents will be continuously agitated or shifted therein, for the purpose specified.

5. The method of processing milk, etc., in hermetically sealed cans, comprising passing a series of filled cans in a continuous stream through a preheater containing a plurality of preheating chambers successively increasing in temperature, the last chamber having a temperature below that required for sterilization; then passing said cans without interruption continuously from the last preheating chamber into and through a sterilizer in which a temperature is maintained sufficient to sterilize the milk, and in which an exterior pressure is maintained greater than atmospheric; then passing said cans without interruption or removal of pressure continuously from said sterilizer into a cooler where the temperature is sufficient to lower the pressure in the cans below 212° F., and wherein there is an exterior pressure in excess of atmospheric and finally discharging the cooled cans continuously from the cooler.

6. In the method of processing milk as set forth in claim 5, exposing the containers to the atmosphere in their passage between the preheater and the sterilizer for the purpose of detecting imperfect cans.

7. In the method of processing milk set forth in claim 5; moving the cans through the preheater, sterilizer and cooler in such manner that the contents of the cans will be continuously agitated or shifted therein, for the purpose specified.

8. The method of processing milk in hermetically sealed cans, consisting in passing the cans successively in a continuous stream through a preheater in which their temperature is raised to a point below that required for sterilization; then passing the preheated cans into and through a sterilizer in which said cans are subjected to a temperature sufficient to sterilize their contents; said preheated cans being exposed to the atmosphere in their passage between the preheater and the sterilizer to enable imperfect cans to be detected and removed; then discharging said cans from said sterilizer and cooling the cans.

9. In the method of processing milk as set forth in claim 8, the cans being moved in such manner through the preheater and sterilizer that their contents will be continuously agitated or shifted therein, for the purpose specified.

10. The method of processing milk in hermetically sealed cans consisting in passing the cans successively in a continuous stream through a preheater in which their temperature is raised to a point below that required for sterilization; then passing said cans without interruption from said preheater into and through a sterilizer in which said cans are subjected to a temperature sufficient to sterilize their contents; said preheated cans being exposed to the atmosphere during their passage between the preheater and the sterilizer for the purpose of detecting imperfect cans; then passing said cans without interruption continuously, from said sterilizer into and through a cooler wherein the cans are subjected to a cooling medium; and finally discharging the cans from the cooler.

11. In the method of processing milk as set forth in claim 10, the cans being moved in such manner through the preheater and sterilizer that their contents will be continuously agitated or shifted therein, for the purpose specified.

In testimony that I claim the foregoing as my own, I affix my signature.

ALBERT R. THOMPSON.